United States Patent
Weber et al.

(10) Patent No.: US 7,531,122 B2
(45) Date of Patent: *May 12, 2009

(54) POLYMER WELDING USING FERROMAGNETIC PARTICLES

(75) Inventors: Jan Weber, Maple Grove, MN (US); Philip Ebeling, Maple Grove, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/403,995

(22) Filed: Mar. 28, 2003

(65) Prior Publication Data
US 2004/0021249 A1 Feb. 5, 2004

(51) Int. Cl.
*B29C 65/02* (2006.01)
*B29C 65/40* (2006.01)
*A61M 25/00* (2006.01)

(52) U.S. Cl. .............. 264/403; 264/487; 264/491; 156/245; 425/174.8 R

(58) Field of Classification Search ......... 264/402–404, 264/486–487, 491, 249; 156/245, 272.4; 425/174.8 R
See application file for complete search history.

(56) References Cited

U.S. PATENT DOCUMENTS

| | | | |
|---|---|---|---|
| 2,863,174 A | 12/1958 | Schuman et al. | |
| 3,574,031 A * | 4/1971 | Heller, Jr. et al. | 428/329 |
| 3,620,876 A | 11/1971 | Guglielmo, Sr. et al. | |
| 3,874,207 A | 4/1975 | Lemelson | |
| 3,896,815 A * | 7/1975 | Fettel et al. | 606/194 |
| 3,957,943 A | 5/1976 | Ogura | |
| 3,966,520 A * | 6/1976 | Fallenbeck et al. | 156/73.1 |
| 3,993,529 A | 11/1976 | Farkas | |
| 4,003,554 A | 1/1977 | Chauffoureaux | |
| 4,035,547 A | 7/1977 | Heller, Jr. et al. | |
| 4,035,598 A | 7/1977 | Van Amsterdam | |
| 4,040,162 A | 8/1977 | Isogai et al. | |

(Continued)

FOREIGN PATENT DOCUMENTS

DE   199 54 960   6/2000

(Continued)

OTHER PUBLICATIONS

U.S. Appl. No. 10/375,719, filed Feb. 25, 2003, Chen, John.

(Continued)

*Primary Examiner*—Matthew J. Daniels
(74) *Attorney, Agent, or Firm*—Crompton, Seager & Tufte LLC.

(57) ABSTRACT

An apparatus and method for bonding polymeric materials is provided. The apparatus and method both utilize ferromagnetic materials in association with the polymeric materials to be bonded together. The polymeric materials, and the ferromagnetic material, are placed within a magnetic field, which causes hysterisis losses in the magnetic field, and thus elevation in the temperature of both the ferromagnetic material and the polymeric materials to the point where the polymeric materials melt and fuse together. The ferromagnetic materials only rise in temperature to their Curie temperatures, at which point the hysterisis losses cease, and the polymeric material stops being heated. Removing the electromagnetic field allows for cooling and fusing. An interface composition may also be placed between the two polymeric materials to be bonded.

16 Claims, 12 Drawing Sheets

U.S. PATENT DOCUMENTS

| | | | |
|---|---|---|---|
| 4,093,484 A | 6/1978 | Harrison | |
| 4,143,112 A | 3/1979 | Turner | |
| 4,298,324 A | 11/1981 | Soulier | |
| 4,339,295 A | 7/1982 | Boretos et al. | |
| 4,390,482 A | 6/1983 | Feurer | |
| 4,407,651 A | 10/1983 | Beck et al. | |
| 4,454,234 A | 6/1984 | Czerlinski | |
| 4,483,341 A | 11/1984 | Witteles | |
| 4,568,262 A | 2/1986 | Feurer | |
| 4,671,757 A | 6/1987 | Volk, Jr. | |
| 4,672,972 A | 6/1987 | Berke | |
| 4,760,228 A | 7/1988 | Kudo | |
| 4,764,394 A | 8/1988 | Conrad | |
| 4,859,380 A | 8/1989 | Ogata | |
| 4,860,744 A | 8/1989 | Johnson et al. | |
| 4,930,494 A | 6/1990 | Takehana et al. | |
| 4,950,239 A | 8/1990 | Gahara et al. | |
| 4,954,678 A * | 9/1990 | Harmony et al. | 219/769 |
| 4,977,886 A | 12/1990 | Takehana et al. | |
| 4,989,608 A | 2/1991 | Ratner | |
| 5,087,804 A * | 2/1992 | McGaffigan | 219/618 |
| 5,104,593 A | 4/1992 | Joseph | |
| 5,154,179 A | 10/1992 | Ratner | |
| 5,172,551 A | 12/1992 | Nakajima et al. | |
| 5,207,227 A | 5/1993 | Powers | |
| 5,222,543 A | 6/1993 | Carlstrom et al. | |
| 5,290,266 A | 3/1994 | Rohling et al. | |
| 5,296,272 A | 3/1994 | Matossian et al. | |
| 5,324,345 A | 6/1994 | Rutjes et al. | |
| 5,330,742 A | 7/1994 | Deutsch et al. | |
| 5,352,871 A | 10/1994 | Ross et al. | |
| 5,411,730 A | 5/1995 | Kirpotin et al. | |
| 5,421,832 A | 6/1995 | Lefebvre | |
| 5,429,583 A | 7/1995 | Paulus et al. | |
| 5,433,717 A | 7/1995 | Rubinsky et al. | |
| 5,484,506 A * | 1/1996 | DuPont et al. | 156/503 |
| 5,496,311 A | 3/1996 | Abele et al. | |
| 5,514,379 A | 5/1996 | Weissleder et al. | |
| 5,622,665 A | 4/1997 | Wang | |
| 5,628,950 A | 5/1997 | Schrenk et al. | |
| 5,641,423 A | 6/1997 | Bridges et al. | |
| 5,653,778 A | 8/1997 | Rutjes et al. | |
| 5,690,109 A | 11/1997 | Govind et al. | |
| 5,693,376 A | 12/1997 | Fetherston et al. | |
| 5,706,810 A | 1/1998 | Rubinsky et al. | |
| 5,720,939 A | 2/1998 | Schroder | |
| 5,728,079 A | 3/1998 | Weber et al. | |
| 5,744,958 A | 4/1998 | Werne | |
| 5,762,741 A | 6/1998 | Kodokian | |
| 5,762,972 A | 6/1998 | Byon | |
| 5,773,042 A | 6/1998 | Amano et al. | |
| 5,775,338 A | 7/1998 | Hastings | |
| 5,787,959 A | 8/1998 | Laxmanan et al. | |
| 5,817,017 A | 10/1998 | Young et al. | |
| 5,844,217 A | 12/1998 | Hawley et al. | |
| 5,855,553 A | 1/1999 | Tajima et al. | |
| 5,908,410 A | 6/1999 | Weber et al. | |
| 5,948,194 A | 9/1999 | Hill et al. | |
| 5,951,513 A | 9/1999 | Miraki | |
| 6,004,289 A | 12/1999 | Saab | |
| 6,035,657 A | 3/2000 | Dobak, III et al. | |
| 6,040,019 A | 3/2000 | Ishida et al. | |
| 6,056,844 A | 5/2000 | Guiles et al. | |
| 6,061,587 A | 5/2000 | Kucharczyk et al. | |
| 6,123,920 A | 9/2000 | Gunther et al. | |
| 6,137,093 A | 10/2000 | Johnson, Jr. | |
| 6,176,857 B1 | 1/2001 | Ashley | |
| 6,190,355 B1 | 2/2001 | Hastings | |
| 6,203,777 B1 | 3/2001 | Schroder | |
| 6,207,134 B1 | 3/2001 | Fahlvik et al. | |
| 6,224,536 B1 | 5/2001 | Pike | |
| 6,231,516 B1 | 5/2001 | Keilman et al. | |
| 6,248,196 B1 | 6/2001 | Waitz et al. | |
| 6,270,707 B1 | 8/2001 | Hori et al. | |
| 6,270,711 B1 | 8/2001 | Gellert et al. | |
| 6,272,370 B1 | 8/2001 | Gillies et al. | |
| 6,280,384 B1 | 8/2001 | Loeffler | |
| 6,352,779 B1 | 3/2002 | Edwards et al. | |
| 6,361,759 B1 | 3/2002 | Frayne et al. | |
| 6,368,994 B1 | 4/2002 | Sklyarevich | |
| 6,418,337 B1 | 7/2002 | Torchia et al. | |
| 6,478,911 B1 | 11/2002 | Wang et al. | |
| 6,696,121 B2 | 2/2004 | Jung, Jr. et al. | |
| 2001/0043998 A1 | 11/2001 | Chen et al. | |
| 2001/0054775 A1 | 12/2001 | Nandu et al. | |
| 2002/0095198 A1 | 7/2002 | Whitebook et al. | |
| 2003/0055449 A1 | 3/2003 | Lee et al. | |
| 2003/0120207 A1 * | 6/2003 | Wang | 604/103 |

FOREIGN PATENT DOCUMENTS

| | | |
|---|---|---|
| EP | 0 355 423 | 2/1990 |
| EP | 0 525 069 | 3/1996 |
| JP | 2001 314390 | 11/2001 |
| WO | WO 80/02124 | 10/1980 |
| WO | WO 89/11874 A1 | 12/1989 |
| WO | WO 99/03306 | 1/1999 |
| WO | WO 00/64608 | 11/2000 |
| WO | WO 01/51115 | 1/2001 |
| WO | WO 03/035161 | 5/2003 |

OTHER PUBLICATIONS

Ashley, S., assoc. ed., "Electric Plastics," *Mechanical Engineering*, Apr. 1998, http://www.memagazine.org/backissues/apri98/features/plastics/plastics.html (Jul. 3, 2003).

Ballinger, J.R., "MRI Contrast Agents," *MRI Tutor Web Site*, http://www.mritutor.org/mritutor/contrast.html (Aug. 8, 2002).

Ballinger, J.R. "Introduction to MRI," *MRI Tutor Web Site*, http://www.mritutor.org/mritutor/index.html (Jul. 3, 2003).

Bowman, M., "The Big Chill," http://www.ameslab.gov/News/Inquiry/fall97/bigchill.html (Aug. 8, 2002).

Exploratorium, "Curie Point," http://www.exploratorium.edu/snacks/curie_point.html (Jul. 3, 2003).

Exploratorium, "Curie Temperature," Abstract from http://www.exploratorium.edu/serf/phenomena/curie_temperature.html (Aug. 8, 2002).

Farlow's Scientific Glasblowing Inc.'s website (various pages).

Gavrin, "What Is Physics Good For?", IUPUI, http://webphysics.iupui.edu/251/251Sp97GFApr28,html (Aug. 8, 2002).

Gould, T.A., "How MRI Works," http://www.howstuffworks.com/mri.htm (Aug. 8, 2002).

Gould, T.A., "How MRI Works," http://electronics.howstuffworks.com/mri.htm/printable (Jul. 3, 2003).

Hesselink, J.R., "Basic Principles Of MR Imaging," http://spinwarp.ucsd.edu/NeuroWeb/Test/br-100.html (Jul. 3, 2003).

Hornak, J.P., *The Basics Of MRI*, http://www.cis.rit.edu/htbooks/mri/chap-1/chap-1.htm, Chapters 1 and 3 (Jan. 4, 2002).

Hornak, J.P., *The Basics Of MRI*, http://www.cis.rit.edu/htbooks/mri, Chapters 1, 2, 6, 8 and 9 (Jul. 3, 2003).

International Search Report PCT US 03/01203, report mailed Jun. 4, 2003.

International Search Report PCT US 03/09494, report mailed Jun. 9, 2003.

King, M.M., "Module #2: Basic Principles Of MRI," http://www.erads.com/mrimod.htm (Aug. 8, 2002).

Koehler, K.R., "Body Temperature Regulation," http://www.rwc.uc.edu/Koehler/biophys/8d.html (Jul. 8, 2003).

Konings, et al., "Heating Around Intravascular Guidewires By Resonating RF Waves," Abstract from *J. Magn. Reson. Imaging*, 12(1):79-85 (2000).

Kuperman, V., *Magnetic Resonance Imaging: Physical Principles And Applications*, Academic Press (2000).

"Laboratory #27: Peltier Elements And Thermistors," Indiana University Dept. of Physics Intermediate Physics Laboratory (P309), http://www.physics.indiana.edu/~dmckinne/p309/ (last modified Nov. 2, 2000).

Ladd, et al., "Reduction Of Resonant RF Heating In Intravascular Catheters Using Coaxial Chokes," Abstract from *Magn. Reson. Med.*, 43(4):615-619 (2000).

Liu, et al., "Safety Of MRI-Guided Endovascular Guidewire Applications," Abstract from *J. Magn. Reson. Imaging*, 12(1):75-78 (2000).

"Magnetism," xrefer, http://www.xrefer.com/entry/489951 (Aug. 8, 2002).

"The Mean Field Model," http://carini.physics.indiana.edu/P616/lecture-notes/mean-field.html (Aug. 8, 2002).

"The Mean Field Model," http://carini.physics.indiana.edu/P616/lecture-notes/mean-field.html (Jul. 3, 2003).

Nitz, et al., "On The Heating Of Linear Conductive Structures As Guide Wires And Catheters In Interventional MRI," Abstract from *J. Magn. Reson. Imaging*, 13(10):105-114 (2001).

"The Nobel Prize In Chemistry 2000," http://www.nobel.se/chemistry/laureates/2000/index.html (Jul. 3, 2003).

"Nobel Prize 2000 For The Discovery And Development Of Conductive Polymers," Panipol Conductive Polymers, Panipol Ltd., http://www.panipol.com/ (Jul. 8, 2003).

"About Technology, Definitions, Advantages, Products, Applications, Evaluation, Techn. History, Contact, References," Panipol Conductive Polymers, Panipol Ltd., http://www.panipol.com/noframes.htm (Jul. 3, 2003).

"The Heatsink Guide: Peltier Coolers," http://www.heatsink-guide.com/peltier.htm (Jul. 3, 2003).

Pierce, J. P., Abstract, Table of Contents, and Chapter 1: "Introduction to Magnetic Nanostructures" in "Tailored Magnetic Nanostructures on Surfaces," available at http://web.utk.edu/~jp/thesisJP.htm, May 2003.

Stephens, J., "Peltier CPU Cooling," http://www.pcmech.com/show/processors/140/ (Aug. 13, 2002).

Tellurex Corporation, "Frequently Asked Questions," http://www.tellurex.com/resource/txfaqc.htm (Sep. 16, 2002).

"'TMD' System Overview," Otari, Inc., http://www.otari.com/products/TMD.html (Aug. 8, 2002).

"Types Of Magnetism," http://www.physics.hull.ac.uk/magnetics/Magnetism/Types/types.html (Aug. 8, 2002).

"Types Of Magnetism," http://www.physics.hull.ac.uk/magnetics/Magnetism/Types/types.html (Jul. 3, 2003).

Wohlgemuth, et al., "Laser-Induced Interstitial Thermotherapy Of The Uterus In An Open MRI System: Preliminary In Vitro And In Vivo Experience," http://www.toshiba-medical.co.jp/tmd/review/rv76/r76_6.thm (Jul. 8, 2003).

* cited by examiner

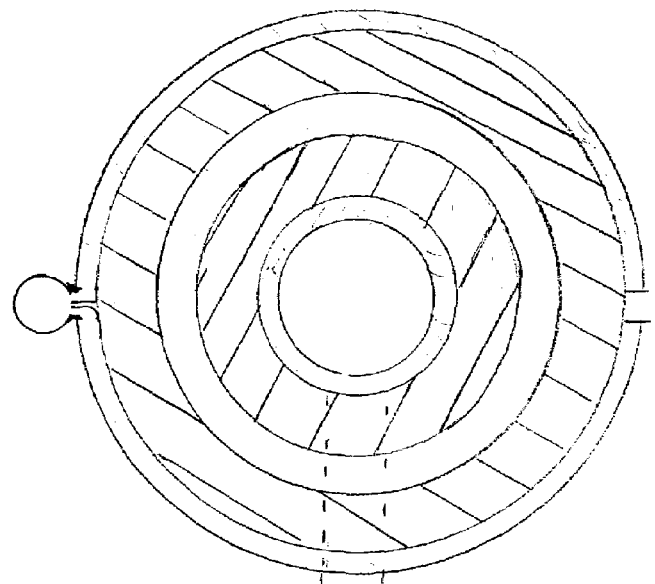
FIG. 6B
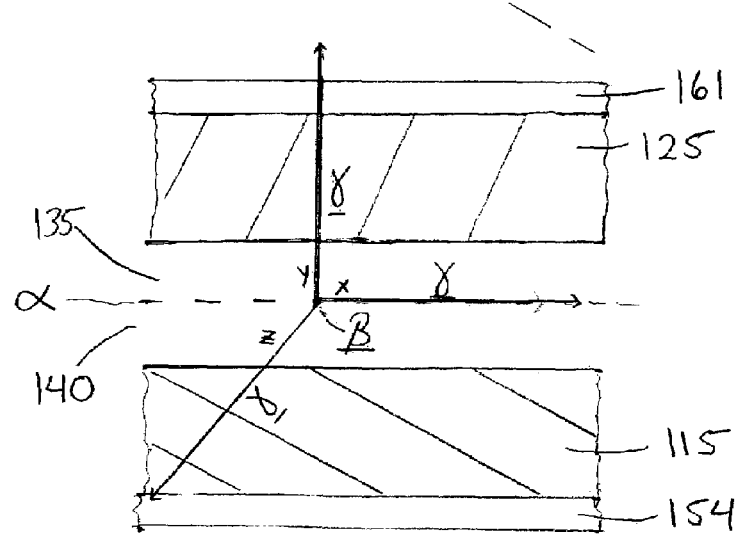

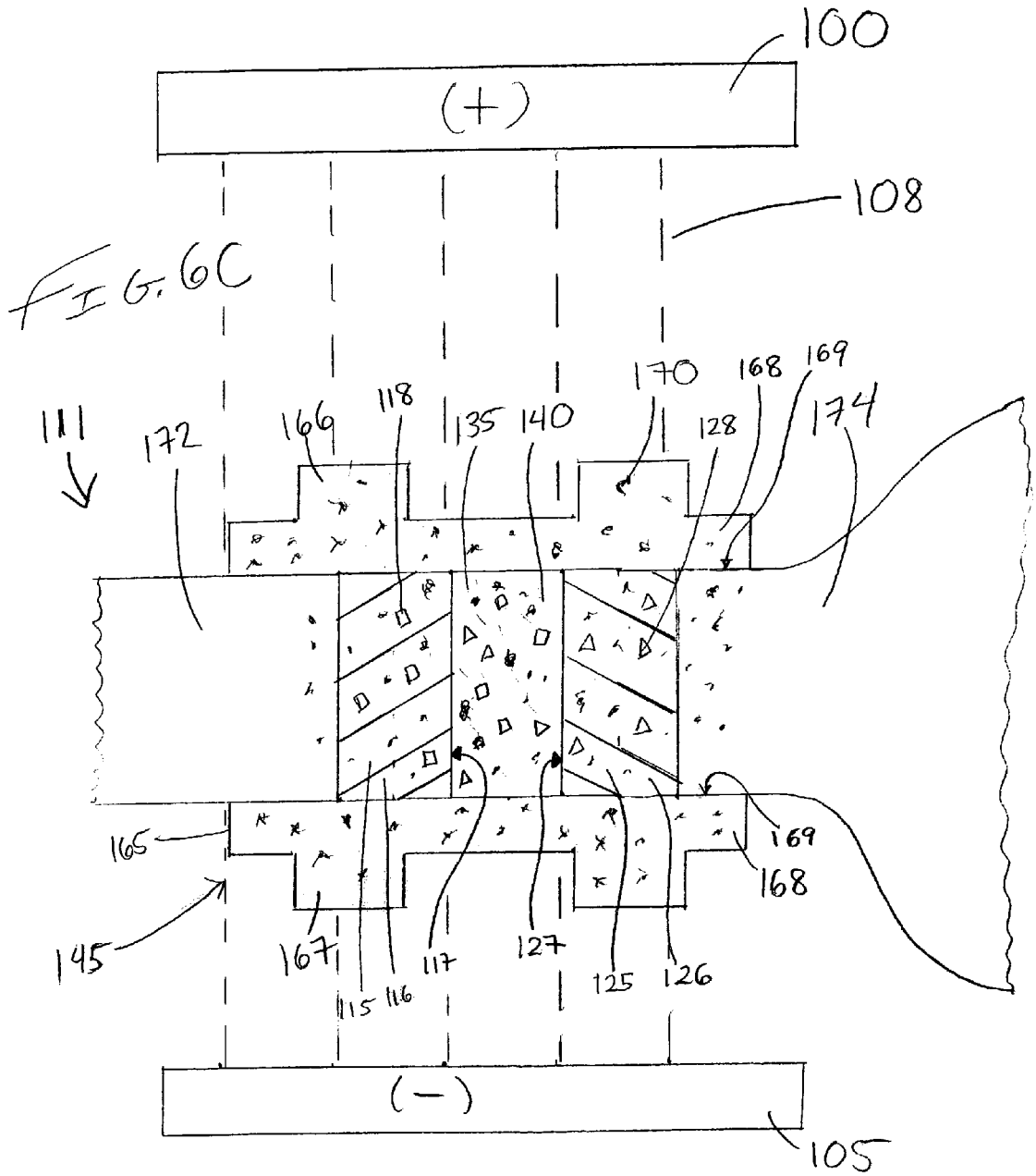

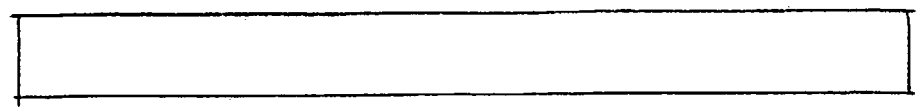
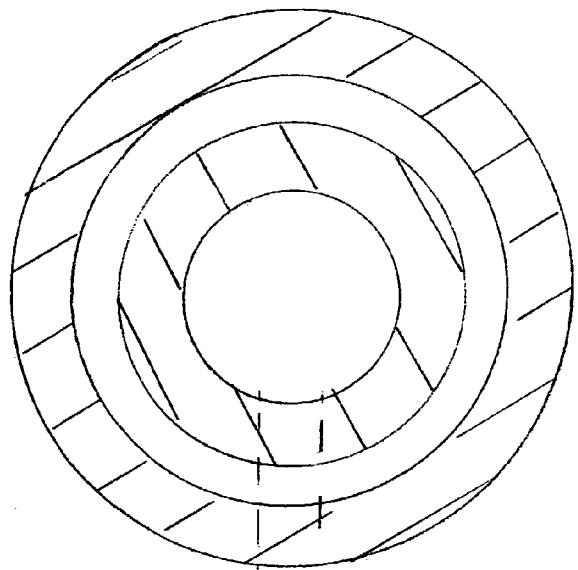
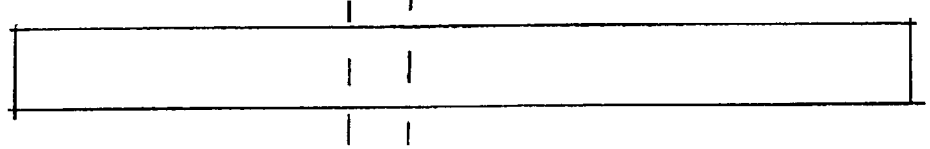
FIG. 7B
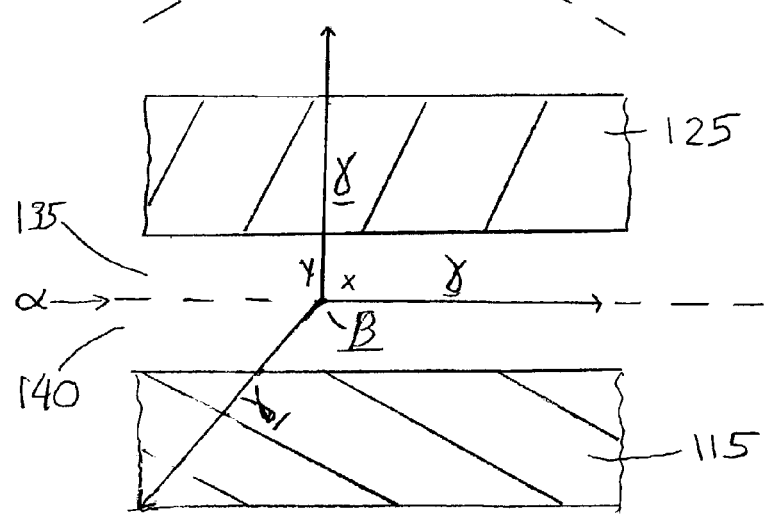

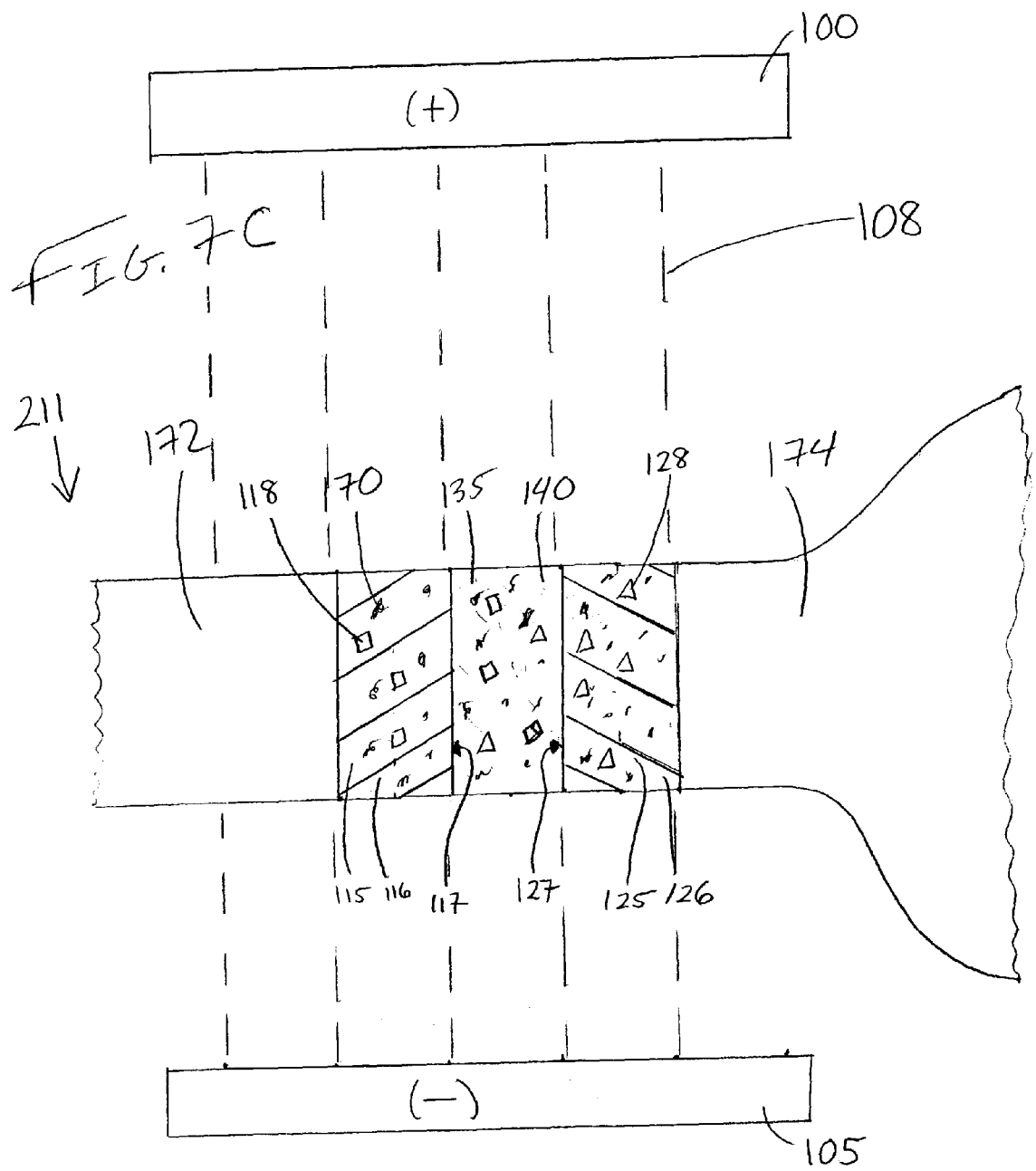

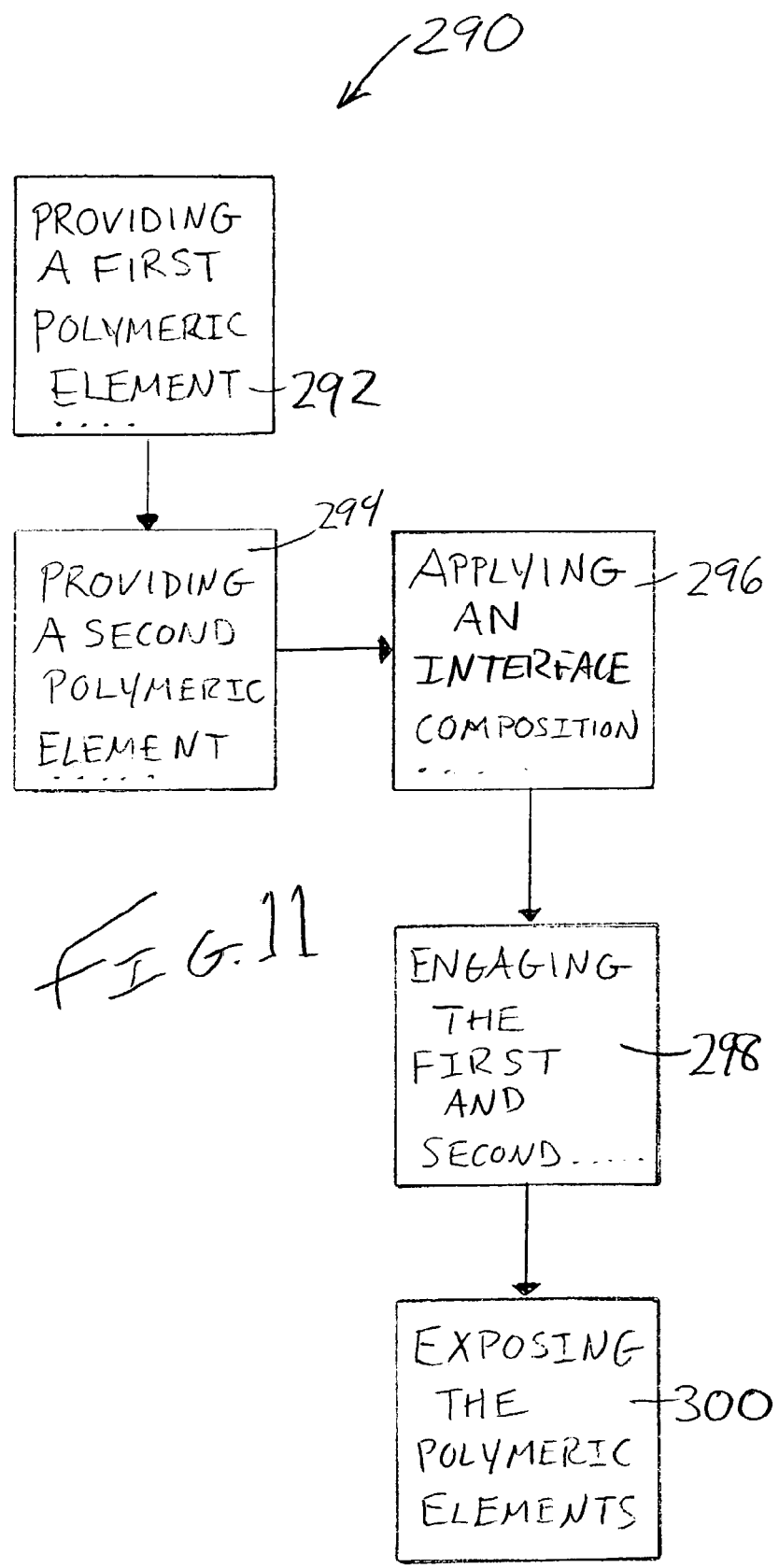

POLYMER WELDING USING FERROMAGNETIC PARTICLES

FIELD OF THE DISCLOSURE

The disclosure generally relates to bonding techniques and, more particularly, relates to methods and apparatuses for bonding polymeric materials, including those found in catheters.

BACKGROUND OF THE DISCLOSURE

Bonding or welding of two or more polymeric components can be accomplished according to a variety of methods. For example, in the construction of medical devices, such as balloon catheters, or the like, it is known to bring the polymeric components of the catheter into contact with a medium which is at the melting temperature of the polymers. More specifically, the polymeric components can be placed within a heated clam shell, or mold-type of device, which surrounds the polymeric material, and transfers heat from the material of the clam shell to the material of the polymeric component. Alternatively, the polymeric materials can be exposed to a hot air stream which is at a temperature sufficient to melt the polymer. A disadvantage of such systems is the time required to bring the polymer to a molding temperature is so great that the transferred heat tends to dissipate throughout the polymeric material and to any adjoining areas of the device. It is therefore difficult to restrict the area affected by the heat.

According to other techniques, it is known to expose a form of energy to the welding area to heat the polymeric material either by direct absorption by the polymeric material, or indirectly, by adding an energy-absorbing additive through the polymer. For example, with regard to laser welding, it is known to disperse an additive throughout the polymeric material which is adapted to absorb the laser frequency. The polymeric material is heated by the hysterisis losses resulting from the laser frequency absorbing additive. While the polymeric material can be heated quickly according to such a method, and the welding spot can be precisely located by direct placement of the energy-absorbing additive, it is difficult to control the temperature accurately.

In still further systems, it is known to add ferromagnetic materials to the polymeric materials and then expose the combined materials to an electromagnetic field. The polymeric material is thereby heated due to hysterisis losses associated with the vibrating ferromagnetic materials. Moreover, one advantage of such a system over the above-referenced laser welding system is that temperatures can be more accurately controlled due to the fact that the hysterisis losses will only occur up to the Curie temperature of the ferromagnetic material. By selecting a ferromagnetic material with a Curie temperature equal to a point at which the polymeric materials will bond, it is possible to heat and bond the polymeric materials, without damage to the polymeric materials due to overheating of the material. Moreover, the materials can be heated quickly with such a system.

Additionally, the electromagnetic field can pass through all polymers and therefore heat ferromagnetic material placed on the inside of such structures, therefore enabling heating from the inside out.

While such systems are effective, the addition of the ferromagnetic material to the device being created has certain inherent drawbacks. For example, the particle size of the ferromagnetic materials currently in use, which are on the order of at least one micron, is such that the particles themselves are often as thick as the walls or individual polymer layers of the devices being created, thereby creating weak spots due to a lack of a chemical connection between the polymer matrix and the ferromagnetic particles. The addition of the ferromagnetic material will also often stiffen the bond site, a disadvantage when the medical device being created must be flexible. A disadvantage of large (i.e., larger than one micron) ferromagnetic particles is the relatively small surface-to-volume ratio in comparison to smaller nano-sized ferromagnetic particles.

In some bonding systems, dissimilar polymeric materials, each containing a micro-dispersion of fine-micron ferromagnetic powders may be bonded to one another using a specially compounded thermoplastic elastomer, containing ferromagnetic material. The compound material contains material similar to that in the polymeric materials being bonded, and the entire composite is heated to the fusion temperature of the same polymeric materials in order to form a chemical bond. The heat is generated using a high alternating current source that results in heat losses between the thermoplastic base material and the abutting joint surface with the heat flowing from the metal filler and melting the adjoining surfaces. However, this technology is in need of further refinements. Such bonding systems have been used in the consumer appliance, automotive and large medical device markets. However, such systems have not been employed in the context of catheter assembly, an area which introduces unique constraints and difficulties. Catheter assembly is characterized by tight (narrow) tolerance, small bond gap applications, and one would not expect success using existing bonding techniques. Additionally, it would be advantageous to have a bonding process for catheter assembly and other contexts that would permit binding of polymeric materials that themselves do not necessarily contain ferromagnetic materials.

At present, catheter bonding technologies are typically limited to two primary technologies: adhesive bonded catheters and thermally bonded catheters. Adhesive-bonded catheters include catheters that require high melt flow polymer adhesives to join incompatible polymeric components together. This technology is undesirable from an operational cost and efficiency perspective due to relatively lengthy cure times, etc. Thermally-bonded catheters include catheters that join compatible polymeric components together. This technology is substantially limiting because the polymeric components to be joined must be of substantially similar, if not identical composition.

Accordingly, there exists a need for more efficient, cost-effective means for bonding catheter components, polymeric materials in general and especially dissimilar materials together.

SUMMARY OF THE DISCLOSURE

In accordance with one aspect of the disclosure, a method of bonding multiple polymeric elements is provided. The method may comprise the steps of distributing ferromagnetic particles through a molding device, placing multiple polymeric elements into operative association with the molding device, exposing the molding device to an electromagnetic field, and heating any polymeric elements by way of contact with the molding device.

In accordance with another aspect of the disclosure, a method of bonding multiple polymeric elements together is provided. The method may comprise the steps of providing a first polymeric element, providing a second polymeric element, applying a material containing ferromagnetic particles to an outside surface of at least one of the first and second polymeric elements, engaging the first and second polymeric elements with the material containing ferromagnetic particles being placed between the first and second polymeric elements, and exposing the material containing ferromagnetic particles to an electromagnetic field. The exposure causes the material to rise in temperature and thereby fuse the first and second polymeric elements together.

In accordance with another aspect of the disclosure, an apparatus for bonding first and second polymeric elements together is provided. The apparatus may comprise a molding element with a surface complementary to at least one of the first and second polymeric elements, ferromagnetic particles operatively associated with the molding element, and a magnetic field source to subject the molding element to a magnetic field. The molding element surface is adapted to engage at least one of the first and second elements.

In accordance with another aspect of the disclosure, a method of bonding multiple polymeric elements together is provided. The method may comprise the steps of distributing ferromagnetic particles through a molding device, placing multiple polymeric elements into operative association with the molding device, placing an interface composition into operative association with the multiple polymeric elements, and heating the polymeric elements and interface composition at least to a fusion temperature of the polymeric element with the highest fusion temperature.

In accordance with another aspect of the disclosure, a method of bonding multiple polymeric elements together is provided. The method may comprise the steps of providing a first polymeric element comprising a first polymer, providing a second polymeric element comprising a second polymer, applying an interface composition that comprises ferromagnetic particles, the first polymer, and the second polymer, to a surface of at least one of the first and second polymeric elements, engaging the first and second polymeric elements at a polymeric interface with the interface composition being placed between the first and second polymeric elements, and exposing the polymeric elements and interface composition to an electromagnetic field, the exposing step causing said elements and composition to rise in temperature and thereby fuse the first and second polymeric elements together.

In accordance with another aspect of the disclosure, a method of bonding multiple polymeric elements together is provided. The method may comprise the following steps. First a molding device is provided. The multiple polymeric elements are placed into operative association with the molding device such that a polymeric element contacts an adjacent polymeric element at a polymeric interface, and wherein there are ferromagnetic particles present within about 500 nanometers (nm) of a plane parallel to surfaces of two adjacent polymeric elements. The said plane is equidistant from said surfaces at the polymeric interface. An interface composition is placed in operative association with the multiple polymeric elements at the polymeric interfaces. The polymeric elements and interface composition are heated at least to a fusion temperature of the polymeric element with the highest fusion temperature.

In accordance with another aspect of the disclosure, a method of bonding multiple polymeric elements together is provided. The method may comprise the following steps. A first polymeric element is provided that comprises a first polymer. A second polymeric element is provided that comprises a second polymer. An interface composition is applied that comprises the first polymer and the second polymer to a surface of at least one of the first and second polymeric elements. The first and second polymeric elements are engaged at an interface with the interface composition being placed between the first and second polymeric elements. The polymeric elements and interface composition are exposed to an electromagnetic field. This exposure step causes said elements and composition to rise in temperature and thereby fuse the first and second polymeric elements together, wherein there are ferromagnetic particles within 500 nm of a plane parallel to surfaces of two adjacent polymeric elements, said plane being equidistant from said surfaces.

In accordance with another aspect of the disclosure, a method of bonding multiple polymeric elements together is provided. The method may comprise the following steps. Ferromagnetic particles are distributed through a molding device. Multiple polymeric elements are placed into operative association with the molding device, wherein the multiple polymeric elements comprise at least a first polymeric element and a second polymeric element. The first polymeric element comprises a first polymer and a second polymeric element comprises a second polymer. The first polymer is present at less than 99.999% by weight in the second polymeric element. The second polymer is present at less than 99.999% by weight in the first polymeric element. A thermoplastic elastomer (TPE) composition is placed into operative association with the multiple polymeric elements including placing the interface composition between the first and second polymeric elements. The TPE composition of the second placing step comprises the first polymer. The second polymer and ferromagnetic particles. The polymeric elements and TPE composition are heated at least to a fusion temperature of the polymeric element with the highest fusion temperature.

In accordance with another aspect of the disclosure, a method of bonding multiple catheter components is provided. The method may comprise the following steps. Ferromagnetic particles are distributed through a molding device. Multiple polymeric elements are placed into operative association with the molding device, wherein each polymeric element is operatively associated with a catheter component. The multiple polymeric elements comprise at least a first polymeric element operatively associated with a first catheter component and a second polymeric element operatively associated with a second catheter component. The first polymeric element comprises a first polymer and a second polymeric element comprises a second polymer. The first polymer is present at less than 99.999% by weight in the second polymeric element. The second polymer is present at less than 99.999% by weight in the first polymeric element. A thermoplastic elastomer (TPE) composition is placed into operative association with the multiple polymeric elements including placing the interface composition between the first and second polymeric elements. The thermoplastic elastomer (TPE) composition of the second placing step comprises the first polymer, the second polymer and ferromagnetic particles. The polymeric elements and thermoplastic elastomer (TPE) composition are heated at least to a fusion temperature of the polymeric element with the highest fusion temperature.

In accordance with another aspect of the disclosure, a method of bonding multiple catheter components is provided. The method may comprise the following steps. A molding device is provided. Multiple polymeric elements are placed into operative association with the molding device, wherein each polymeric element is operatively associated with a catheter component. The multiple polymeric elements comprise at least a first polymeric element operatively associated with a first catheter component and a second polymeric element operatively associated with a second catheter component. The first polymeric element comprises a first polymer and a second polymeric element comprises a second polymer. The first polymer is present at less than 99.999% by weight in the second polymeric element. The second polymer is present at less than 99.999% by weight in the first polymeric element. An interface composition is placed into operative association with the multiple polymeric elements including placing the interface composition between the first and second polymeric elements; wherein the interface composition of the second placing step comprises the first polymer and the second polymer. The polymeric elements and interface composition are heated at least to a fusion temperature of the polymeric element with the highest fusion temperature.

In accordance with another aspect of the disclosure, a method of bonding multiple polymeric elements together is provided. The method may comprise the following steps. A first polymeric element comprising a first polymer is provided. A second polymeric element comprising the second polymer is provided. The first polymeric element comprises less than 99.999% by weight of the second polymer. The second polymeric element comprises less that 99.999% by weight of the first polymer. A thermoplastic elastomer (TPE) composition, comprising ferromagnetic particles, the first polymer, and the second polymer, is applied to a surface of at least one of the first and second polymeric elements. The first and second polymeric elements are engaged at an interface with the TPE composition being placed between the first and second polymeric elements. The polymeric elements and TPE composition are exposed to an electromagnetic field, the exposing step causing said elements and composition to rise in temperature and thereby fuse the first and second polymeric elements together.

In accordance with another aspect of the disclosure, a method of bonding two catheter components together is provided. The method may comprise the following steps. A first polymeric element comprising a first polymer is provided. A second polymeric element comprising the second polymer is provided. The first polymeric element comprises less than 99.999% by weight of the second polymer. The second polymeric element comprises less that 99.999% by weight of the first polymer. The first polymeric element is operatively associated with a first catheter component and the second polymeric element is operatively associated with a second catheter component. A thermoplastic elastomer (TPE) composition, comprising ferromagnetic particles, the first polymer, and the second polymer, is applied to an outside surface of at least one of the first and second polymeric elements. The first and second polymeric elements are engaged at a polymeric interface with the TPE composition being placed between the first and second polymeric elements. The polymeric elements and TPE composition are exposed to an electromagnetic field, the exposing step causing said elements and composition to rise in temperature and thereby fuse the first and second polymeric elements together.

In accordance with another aspect of the disclosure, a method of bonding multiple polymeric elements together is provided. The method may comprise the following steps. A first polymeric element comprising a first polymer is provided. A second polymeric element comprising the second polymer is provided. The first polymeric element comprises less than 99.999% by weight of the second polymer. The second polymeric element comprises less that 99.999% by weight of the first polymer. An interface composition, comprising the first polymer and the second polymer, is applied to a surface of at least one of the first and second polymeric elements. The first and second polymeric elements are engaged at an interface with the interface composition being placed between the first and second polymeric elements. The polymeric elements and interface composition are heated at least to a fusion temperature of the polymeric element with the highest fusion temperature.

In addition to the foregoing, the disclosure includes, as an additional aspect, all embodiments of the disclosure narrower in scope in any way than the variations specifically mentioned above. Although the applicant(s) invented the full scope of the claims appended hereto, the claims appended hereto are not intended to encompass within their scope the prior art work of others. Therefore, in the event that statutory prior art within the scope of a claim is brought to the attention of the applicants by a Patent Office or other entity or individual, the applicant(s) reserve the right to exercise amendment rights under applicable patent laws to redefine the subject matter of such a claim to specifically exclude such statutory prior art or obvious variations of statutory prior art from the scope of such a claim. Variations of the disclosure defined by such amended claims also are intended as aspects of the disclosure.

The above aspects and features of the disclosure will become more apparent from the following detailed description, when taken in conjunction with the accompanying drawings.

BRIEF DESCRIPTION OF THE DRAWINGS

FIG. 6B is an enlargement of one segment of the view shown in FIG. 6A, and highlighting additional teachings of the disclosure.

FIG. 6C is the diagrammatic cross-sectional view of a variation on the embodiment of that shown in FIG. 6A.

FIG. 7B is an enlargement of the view shown in FIG. 7A, and highlighting additional teachings of the disclosure.

FIG. 7C is the diagrammatic cross-sectional view of a variation on the embodiment of that shown in FIG. 7A.

FIG. 11 is a flow chart depicting sample steps that may be taken according to a sixth method taught by the disclosure; and While the disclosure is susceptible to various modifications and alternative constructions, certain illustrative embodiments thereof have been shown in the drawings and will be described below in detail. It should be understood, however, that there is no intention to limit the disclosure to the specific embodiments disclosed, but on the contrary, the intention is to cover all modifications, alternative constructions, and equivalents falling within the spirit and scope of the disclosure as defined by the appended claims.

DETAILED DESCRIPTION

Figure 1:
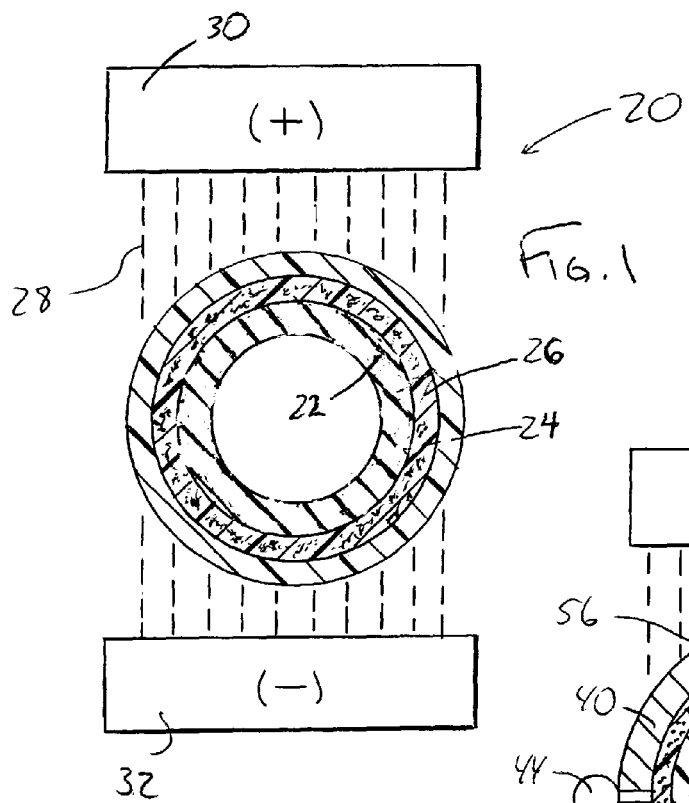
FIG. 1 is the diagrammatic cross-sectional view of the apparatus according to the teachings of the disclosure.

Referring now to the drawings and with specific reference to FIG. 1, a bonding apparatus constructed in accordance with the teachings of the disclosure is generally referred to by reference numeral 20. The following disclosure will be provided with specific reference to the bonding of polymeric materials for the creation of medical devices such as balloon catheters, but it is to be understood that the bonding methods and apparatus disclosed herein can be used for the creation of multiple other devices including other medical devices.

In the embodiment depicted in FIG. 1, a first polymeric material 22, which may be the inner lining of a balloon catheter, is shown being bonded to a second polymeric material 24, which may be the outer surface of a balloon catheter. Without limiting the disclosure to the specific polymers referenced herein, suitable polymers for such usage include polytetrafluoroethylene (PTFE), polytetrafluoroethylene copolymer, tetrafluoro ethylene (TFE), polyvinylidine fluoride (PVDF), polyamides, polyamide/ether block copolymers, polyester/ether block copolymers, polyolefins, polypropylene (PP), polyurethane (PU), ethylene vinyl acetate copolymers (EVA), polyethylene terephthalate (PET), polyethylene napthalenedicarboxylate (PEN), polyethylene (PE), polyamide polymers (PA), Nylon 6, Nylon 6,6, Nylon 6,6/6, Nylon 11 and Nylon 12, as well as many other types of thermoplastic or thermo-set polymers.

In the depicted embodiment of FIG. 1, a coating of ferromagnetic material 26 is provided between the first and second polymers 22, 24. Many ferromagnetic particles are suitable for such use, but can be provided in nano-sized particles made of compositions of magnetite in the form of $Fe_3O_4$, $Fe_2O_3$, $Cr_2O_3$ and $FeCr_2O_4$. The specific composition of the nano-particle made out of alloys of such materials defines the Curie temperature. During the production process of these nano-particles, the specific ratio of the oxides is determined by the oxygen flow. For example, in making $Fe_xO_y$ nano-particles, one is able to increase the ratio $Fe_2O_3\backslash Fe_3O_4$ by increasing the oxygen flow and vice versa. Such nano-particles have been found to be advantageous due to, among other things, their relatively small particle size, which is typically on the order of 5-10 nanometers. Such sizes are advantageous in the formation of relatively small medical devices to avoid the creation of the weak spots referenced above, and also to result in better heat transfer from the embedded particles to the surrounding polymer matrix due to their large surface-to-volume ratio. When embedded inside a polymer matrix, it is advantageous to have a chemical connection between the particles and the matrix.

As also shown in FIG. 1, a magnetic field 28 is created by an anode 30 and a cathode 32. Of course, the magnetic field 28 can be created by any other suitable form of apparatus. The first and second polymeric materials 22, 24 and the ferromagnetic material 26 form an assembly 33 placed within the magnetic field 28.

Figure 2:
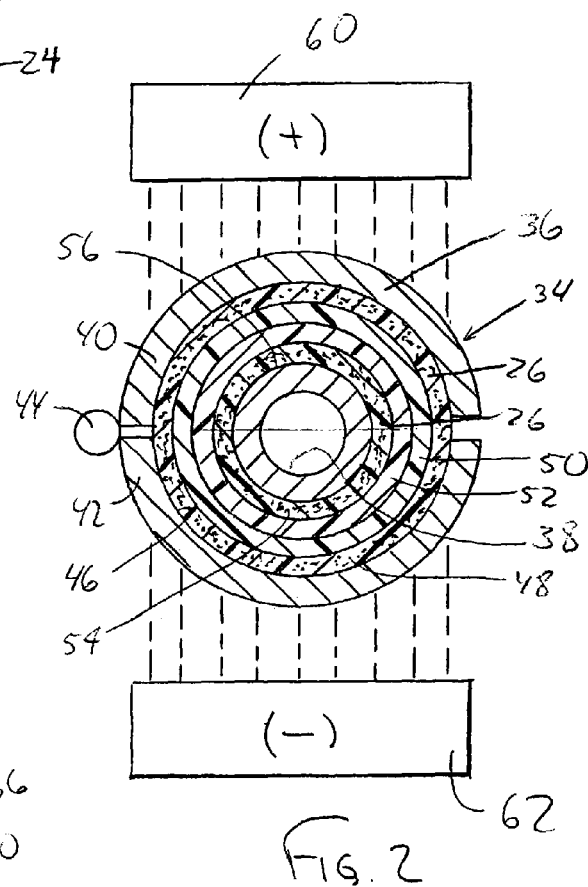
FIG. 2 is a diagrammatic cross-sectional view of an alternative embodiment of an apparatus constructed in accordance with the teachings of the disclosure.
Figure 3:
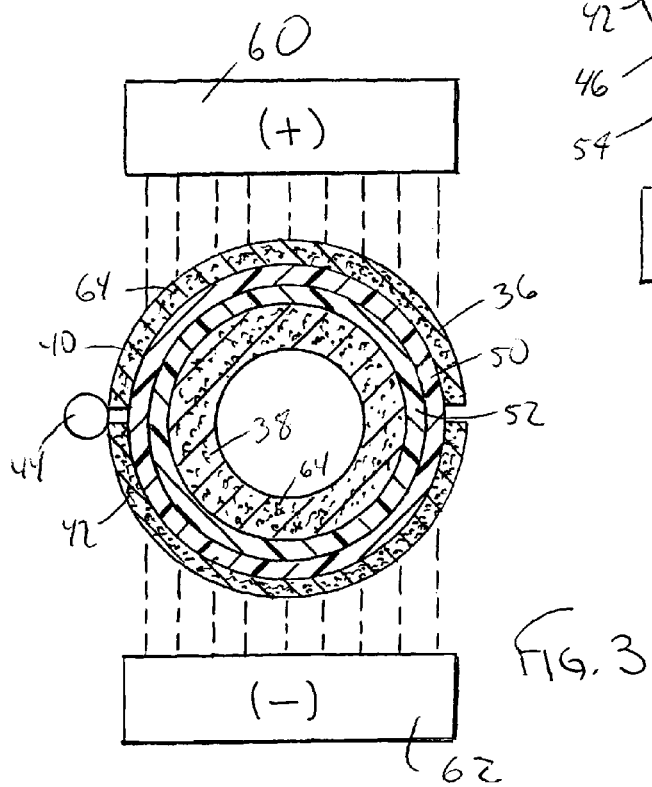
FIG. 3 is a diagrammatic cross-sectional view of a second alternative embodiment of an apparatus constructed in accordance with the teachings of the disclosure.

The embodiments of FIGS. 2 and 3 are dissimilar to that of FIG. 1 in that the ferromagnetic material 26 is not divided between the polymeric materials 22, 24 and, thus, does not remain within the created medical device. Rather, as shown first with regard to FIG. 2, the ferromagnetic material 26 is provided as an outer layer of a molding device 34. The molding device 34 can be provided in a number of forms, but as depicted in FIG. 2, includes a clam shell 36 and a mandrel 38. The clam shell 36 may include first and second complementary sections 40, 42 joined by a hinge 44. Accordingly, it can be seen that the clam shell sections 40, 42 can be pivoted about the hinge 44 to allow for access of the first and second polymeric materials 22, 24 into and out of the clam shell 36. Each of the clam shell sections 40, 42 include an interior surface 46 upon which is coated a layer of ferromagnetic material 48. The shape of the clam shell sections 40, 42 as well as the interior surfaces 46 are so as to be congruent with the outer shape of the first polymeric material 50. Radially inward and adjacent to the first polymeric material 50 is a second polymeric material 52, which rests against a second layer of ferromagnetic material 54. The second layer of ferromagnetic material 54 is coated on an outer surface 56 of the mandrel 38. Accordingly, it can be seen that the first and second polymeric materials 50, 52 are supported both from the outside by the clam shell 36, and from the inside by the mandrel 38. Moreover, due to the provision of first and second layers of ferromagnetic material 48, 54, the heat created thereby, when exposed to a magnetic field 58, is able to be more quickly dissipated through the first and second layers of polymeric material 50, 52. Again, the magnetic field 58 can be created by an anode and a cathode (60, 62), or by any other suitable form of magnetic field creation.

The embodiment of FIG. 3 is similar to that of FIG. 2, but for the provision of magnetic material 64 directly within the clam shell 36, and the mandrel 38. Accordingly, wherein like elements are depicted, like reference numerals are employed. Such an embodiment could be provided by casting the clam shell sections 40, 42 from molten material containing the ferromagnetic material therein, or any other suitable formation technique.

In any of the aforementioned embodiments, it is possible to tailor the combination of elements to provide ferromagnetic material in only those positions where it is desired. For example, while not depicted in cross-sectional views of FIGS. 1-3, it will be readily understood by one of ordinary skill in the art, that the ferromagnetic material could be provided in the form of a plurality of rings longitudinally spaced along the first and second polymeric layers. Alternatively, if the first and second polymeric materials are only to be bonded in certain sections, the ferromagnetic material can be placed in only those positions where the bonding is desired.

Figure 4:
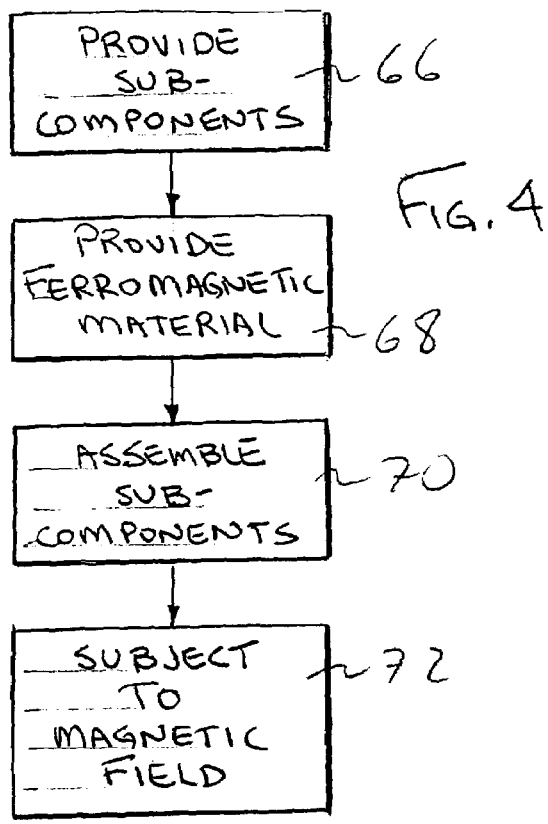
FIG. 4 is a flow chart depicting sample steps which may be taken according to a first method taught by the disclosure.
Figure 5:
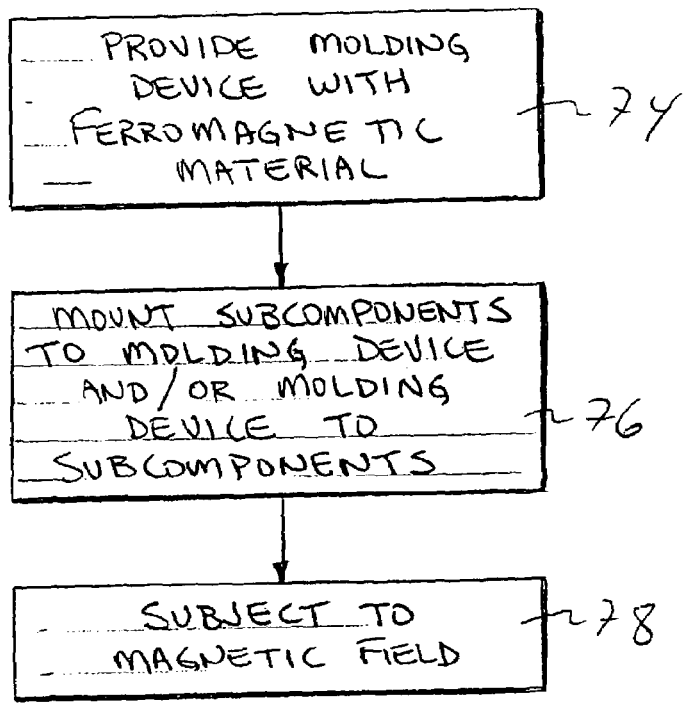
FIG. 5 is a flow chart depicting a sample sequence of steps which may be taken according to a second method taught by the disclosure.

Referring now to FIGS. 4 and 5, flow charts are provided to depict a sample sequence of steps which may be taken in connection with the apparatus described above and depicted in FIGS. 1-3. First with regard to the flowchart of FIG. 4, reference being simultaneously had to the apparatus of FIG. 1, a first step 66 may be to provide subcomponents such as the first polymeric material 22 and the second polymeric material 24. A second step 68 would be to provide the layer of ferromagnetic material 26. The step 68 may be accomplished by applying a paint with dissolved ferromagnetic particles. A third step 70 may be to then assemble the first and second polymeric layers 22, 24 with the ferromagnetic material 26 therebetween. Finally, a fourth step 72 would be to expose the first and second polymeric materials 22, 24 and ferromagnetic material 26 to the magnetic field 28 by, for example, energizing the anode and cathode 30, 32. The magnetic field 28 causes vibration of the ferromagnetic material 26, with the resulting hysterisis losses causing the ferromagnetic material 26 to rise in temperature, and accordingly for the first and second polymeric materials 22, 24 to rise in temperature as well. By matching the Curie temperature of the ferromagnetic material 26 to the melting points of the first and second polymeric materials 22, 24, the polymers are heated to a temperature sufficient to allow for them to fuse together, without overheating the materials.

As shown in FIG. 5, the apparatus of FIGS. 2 and 3 can be used according to the following method. A first step 74 is to provide the molding device 34 with the ferromagnetic material already therein. As indicated above, this can be accomplished by painting an inner or outer surface of the molding device 34 with the ferromagnetic material, dipping the molding device in the ferromagnetic material, molding or otherwise fabricating the molding components to have the ferromagnetic material already therein, or the like. A second step 76 may then be to mount the subcomponents to the molding device 34, or the molding device 34 to the subcomponents. More specifically, the first polymer 50 may be mounted to the mandrel 38, with the second polymer 52 then being mounted to the outside of the first polymer 50. The first and second polymeric materials 50, 52, and the mandrel 38 may all be placed inside the clam shell 36. A third and final step 78 may then be to subject the assembly to the magnetic field 58 as by energizing the anode and cathode 60, 62 and heating the components to the Curie temperature of the ferromagnetic material as indicated above.

In the embodiments depicted in FIGS. 2 and 3, it will be clear that choosing a specific ferromagnetic substance with a first Curie temperature to be applied on the mandrel that matches a melting polymer on the inner layer of the tube construction, and a second ferromagnetic material with a second Curie temperature for the clam shell which is the melting temperature of the outer polymer layer, will allow polymers with different melting temperatures to be welded more easily than by choosing a welding system with one temperature setting. From the foregoing, one of ordinary skill in the art will recognize that the apparatus, as disclosed herein, provides for a polymeric fusing or bonding technique and an apparatus that enables for rapid and controllable temperature elevation.

Additional aspects of the disclosure are demonstrated by the bonding apparatuses 110, 111, 210 and 211 shown in FIGS. 6A, 6B, 6C, 7A, 7B and 7C, which are variations on apparatus 20 shown in FIGS. 1-3, and which may incorporate any or all properties described therefore.

Figure 6A:
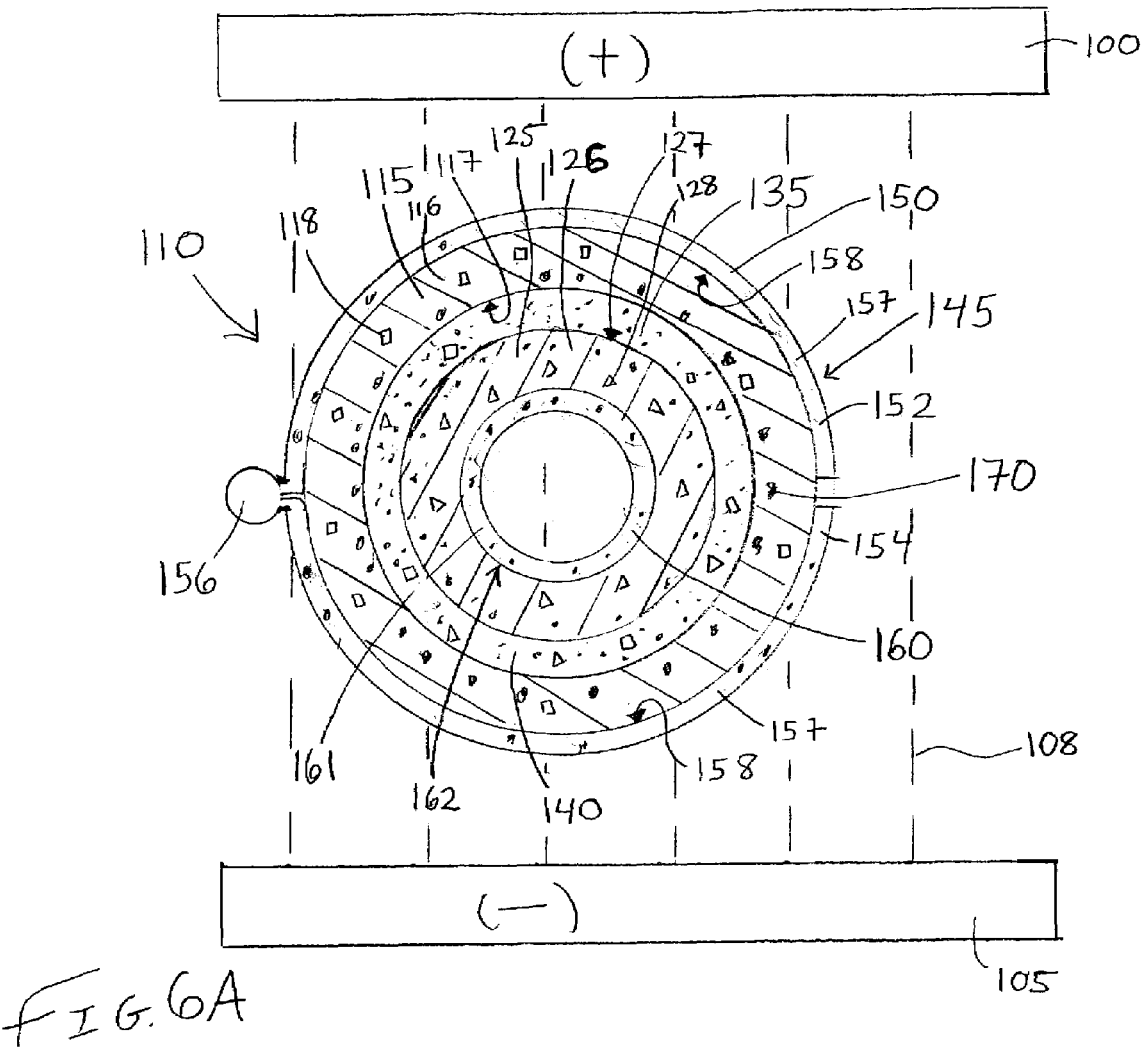
FIG. 6A is the diagrammatic cross-sectional view of a third alternative embodiment of an apparatus constructed in accordance with the teachings of the disclosure.

In FIG. 6A, a bonding apparatus 110 consistent with the teachings of the disclosure is shown that may be placed between an anode 100 and cathode 105 capable of generating a magnetic field 108 along with any other necessary equipment as understood by those of skill in the art. A first polymeric element 115 may be provided that comprises both an interior 116 and an exterior surface 117. The first polymeric element 115 may further comprise a first polymer 118. A second polymeric element 125 may be provided that comprises both an includes an interior 126 and an exterior surface 127. The second polymeric element 125 may further comprise a second polymer 128. Between first polymeric element 115 and second polymeric element 125 is an interface 135 that may be filled by an interface composition 140 operatively associated with the first and second polymeric elements 115 and 125. This disclosure does not limit the number of types of polymers that can be in an interface composition. This disclosure also does not limit the number of polymeric elements that may be joined.

The bonding apparatus 110 may comprise a molding device 145 such as a clam shell 150 or a mandrel 160. The clam shell 150 may include first and second complementary sections 152, 154 joined by a hinge 156. Accordingly, it can be seen that the clam shell sections 152, 154 can be pivoted about the hinge 156 to allow for access of the first and second polymeric elements 115 and 125 into and out of clam shell 150. Both complementary sections 152, 154 include an interior 157 and interior surface 158. The molding device may further include or include in the alternative a mandrel 160 with interior 161 and surface 162.

Ferromagnetic material, e.g. particles, 170 may be included throughout the bonding apparatus 110 or may be limited to particular regions such as the first and second polymeric elements, 115, 125, interface composition 140 and molding device 145. The ferromagnetic particles 170 may include the attributes as described in connection with ferromagnetic material 26 in FIGS. 1-3. When part of the first polymeric element 115, ferromagnetic particles 170 may reside in either the interior 116 or the surface 117 or both. When part of the second polymeric element 125, ferromagnetic particles 170 may reside in either the interior 126 or the surface 127 or both. When part of the molding device 145, the ferromagnetic particles may be part of the clam shell 150 or mandrel 160, or any other type of molding device when present. When part of the clam shell 150 the ferromagnetic particles 170 may reside in either the first complementary section 152 or second complementary section 154 or both. The ferromagnetic particles may reside in either the interior 157 or surface 158 or both locations of the first and second complementary portions 152, 154. The ferromagnetic particles may also be operatively associated with the hinge 156.

As demonstrated in FIG. 6B, the existence of ferromagnetic particles 170 in any one region of the bonding apparatus 110 is not of primary significance to the teaching of this disclosure. Rather, the ferromagnetic particles 170 must be in sufficient proximity of the interface 135 to allow for bonding of polymeric elements 115, 125. This proximity can be described by imagining a plane $\alpha$ in the interface 135 that is equidistant from the first and second polymeric elements 115, 125. Point $\beta$ represents any and all points residing in plane $\alpha$ such that ferromagnetic particles 170 reside within a distance $\gamma$ from point in plane $\alpha$. Distance $\gamma$ will vary depending on the thickness of the bonding apparatus 110, but is generally understood to be at least that distance from the plane $\alpha$ to the exterior of the bonding apparatus 110. Distance $\gamma$ may be from zero to about 500 nanometers (nm) in some embodiments. In some embodiments, the distance $\gamma$ is from zero to about 400 nm. In some embodiments, the distance $\gamma$ is from zero to about 300 nm. In some embodiments, the distance $\gamma$ is from zero to about 200 nm. In some embodiments, the distance $\gamma$ is from about zero to about 100 nm. In some embodiments, the distance $\gamma$ is from zero to about 50 nm. In some embodiments, the distance $\gamma$ is from zero to about 10 nm. In some embodiments, the distance $\gamma$ is from zero to about 1 nm. The placement of ferromagnetic particles described above for bonding apparatus 110 is applicable as well for that of other embodiments of this disclosure including apparatus 20 described above in connection with FIGS. 1-3 and apparatus 111, 210, and 211 described below. The ferromagnetic particles 170 are absent from the polymeric elements, e.g. 115, 125 and interface composition, when it is desired that the resulting bonded product be free of ferromagnetic particles. In some such embodiments, ferromagnetic material is absent from the molding device 145 as well, the heating required for fusion being generated in a manner independent of ferromagnetic material. It should be stressed that while the figures show ferromagnetic material 170 present in many different regions, this demonstration is for demonstrative purposes only. Ferromagnetic material 170 may or may not be present in the particular locations as shown in the figures. Moreover, in some embodiments, ferromagnetic material 170 may also be present in particular locations even though not so shown in the figures.

The interface composition 140 may comprise ferromagnetic particles 170, a first polymer 118 and a second polymer 128. In some embodiments, the first polymeric element 115 is substantially composed of a first polymer 118, and the second polymeric element 125 is substantially composed of a second polymer 128. In some embodiments, the first polymeric element 115 comprises from zero to about 99.999% of a second polymer 128 by weight, and the second polymeric element 125 comprises from zero to about 99.999% of a first polymer 118 by weight. In some embodiments, the first polymeric element 115 comprises from zero to about 90% of a second polymer 128 by weight, and the second polymeric element 125 comprises from zero to about 90% of a first polymer 118 by weight. In some embodiments, the first polymeric element 115 comprises from zero to about 80% of a second polymer 128 by weight, and the second polymeric element 125 comprises from zero to about 80% of a first polymer 118 by weight. In some embodiments, the first polymeric element 115 comprises from zero to about 70% of a second polymer 128 by weight, and the second polymeric element 125 comprises from zero to about 70% of a first polymer 118 by weight. In some embodiments, the first polymeric element 115 comprises from zero to about 60% of a second polymer 128 by weight, and the second polymeric element 125 comprises from zero to about 60% of a first polymer 118 by weight. In some embodiments, the first polymeric element 115 comprises from zero to about 50% of a second polymer 128 by weight, and the second polymeric element 125 comprises from zero to about 50% of a first polymer 118 by weight. In some embodiments, the first polymeric element 115 comprises from zero to about 40% of a second polymer 128 by weight, and the second polymeric element 125 comprises from zero to about 40% of a first polymer 118 by weight. In some embodiments, the first polymeric element 115 comprises from zero to about 30% of a second polymer 128 by weight, and the second polymeric element 125 comprises from zero to about 30% of a first polymer 118 by weight. In some embodiments, the first polymeric element 115 comprises from zero to about 20% of a second polymer 128 by weight, and the second polymeric element 125 comprises from zero to about 20% of a first polymer 118 by weight. In some embodiments, the first polymeric element 115 comprises from zero to about 10% of a second polymer 128 by weight, and the second polymeric element 125 comprises from zero to about 10% of a first polymer 118 by weight. In some embodiments, the first polymeric element 115 comprises from zero to about 5% of a second polymer 128 by weight, and the second polymeric element 125 comprises from zero to about 5% of a first polymer 118 by weight. In some embodiments, the first polymeric element 115 comprises from zero to about 1% of a second polymer 128 by weight, and the second polymeric element 125 comprises from zero to about 1% of a first polymer 118 by weight. In those embodiments, where two polymeric elements are not identical in composition, they are considered "dissimilar." Polymeric elements of any composition, whether identical to one another in composition, similar to one another in composition or dissimilar to one another in composition, may be used in accordance with the teachings of this disclosure. In some embodiments, all the polymeric elements to be joined will be identical in composition. In some embodiments, all the polymeric elements to be joined will be dissimilar in composition. In some embodiments, some of the polymeric elements to be joined may be identical in composition, and some may be dissimilar in composition. It is understood that two polymeric elements may be dissimilar in composition, and yet collectively contain polymers that are similar in their physical, chemical and other properties. In some embodiments, the first polymer 118 is a thermoplastic elastomer (TPE) and the second polymer 128 is an non-compatible TPE material. In some embodiments the interface composition 140 comprises a TPE and a non-compatible TPE material, and is referred to as a TPE composition as a specific embodiment of the interface composition 140. Some examples of dissimilar polymer pairs include PET/PE, PA(polyamide)/PE, PET/PA, PET/polyolefin, PA/polyolefin, PET/Nylon 6, PET/Nylon 6,6, PET/Nylon 6,6/6, PET/Nylon 11, PET/Nylon 12, and PA/PU(polyurethane).

FIG. 6C shows a bonding apparatus 111 that is a specific embodiment of the apparatus 110 shown in FIG. 6A. In FIG. 6C, the first and second polymeric elements 115, 125 are operatively connected to a first catheter component 172 and a second catheter component 174 respectively. The molding device 145 shown in FIG. 6C is a clamp mold 165 for demonstrative purposes only. The clamp mold 165 may comprise first segment 166 and second segment 167. The clamp mold 165 may also be envisioned as a sleeve that wraps around the catheter components 172, 174. Each clamp mold segment 166, 167 comprises an interior 168 and an outer surface 169. Ferromagnetic particles 170 may reside in either the interior 168 or on the outer surface 169 or in both locations. In FIG. 6C, the first catheter component 172 is shown as a catheter shaft and the second catheter component 174 is shown as a balloon for demonstrative purposes only. Both first and second catheter components 172, 174 may be shafts, both may be balloons, etc.

Figure 7A:
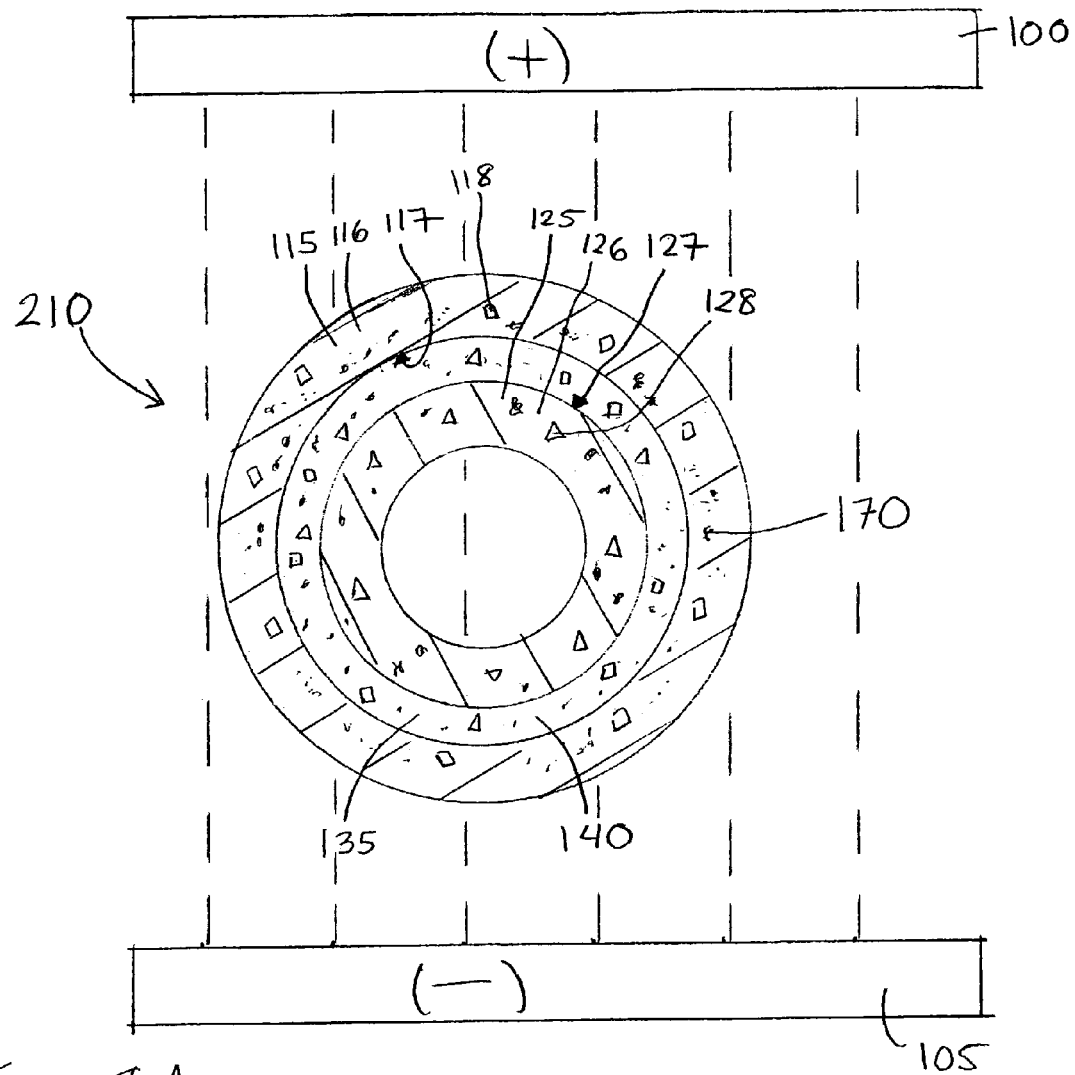
FIG. 7A is the diagrammatic cross-sectional view of a fourth alternative embodiment of an apparatus constructed in accordance with the teachings of the disclosure.
Figure 8:
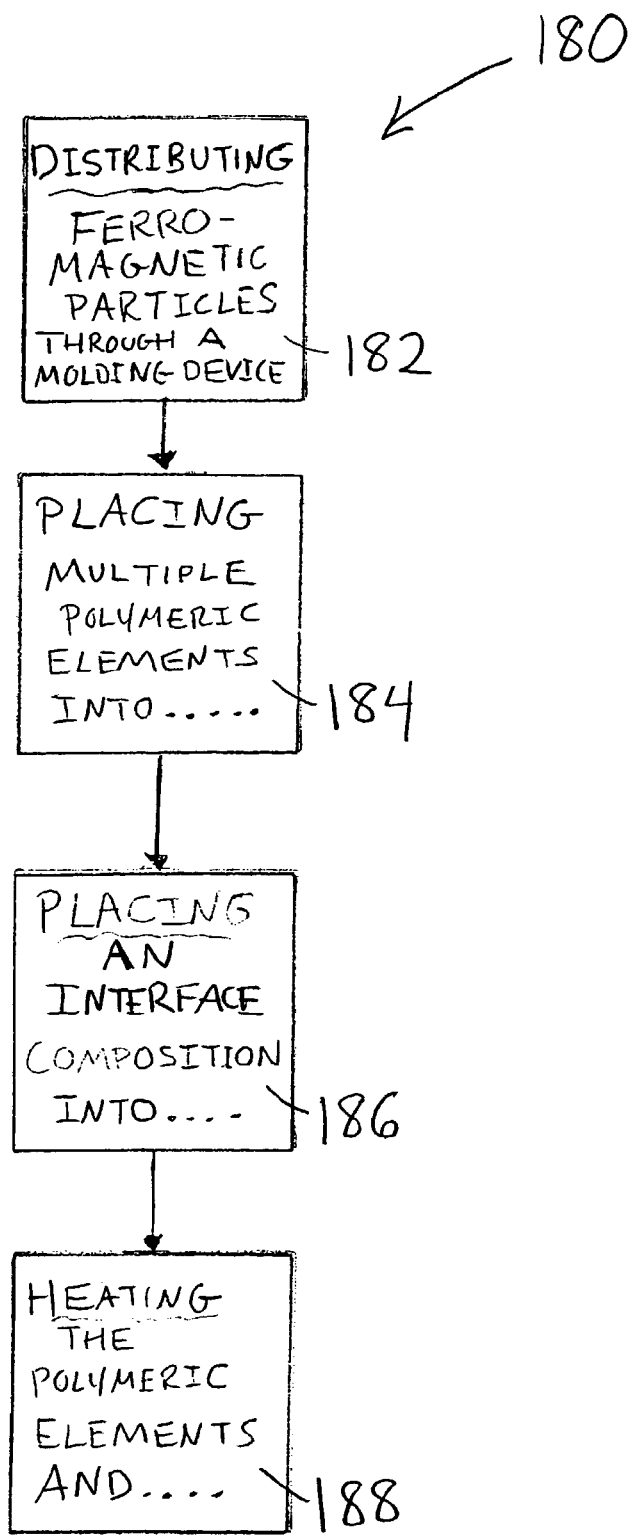
FIG. 8 is a flow chart depicting sample steps that may be taken according to a third method taught by the disclosure.

The bonding apparatuses 210 and 211 shown in FIGS. 7A-C are variations on those apparatuses shown in FIGS. 6A-C, differing principally in the absence of a molding device 145. The bonding apparatuses of this disclosure, while shown with just first and second polymeric elements, may comprise polymeric elements greater than two, and no specific upper limit on the number of polymeric elements is envisioned.

Referring now to FIGS. 8-11, flow charts are provided to depict a sample sequence of steps that may be taken in connection with the apparatus described above and depicted in FIGS. 6A-7C. First with regard to the flowchart of FIG. 8, reference being simultaneously had to the apparatus of FIG. 6A, a method 180 of bonding multiple polymeric elements is provided that may comprise a first step 182 of distributing ferromagnetic particles 170 through a molding device 145. A second step 184 may be to place multiple polymeric elements, e.g. 115, 125, into operative association with the molding device 145. A third step 186 may to provide an interface composition 140 into operative association with the multiple polymeric elements, e.g. 115, 125. A fourth step 188 may be to heat the polymeric elements and interface composition at least to a fusion temperature of the polymeric element with the highest fusion temperature.

In some embodiments, the molding device 145 in the method 180 is a clam shell mold 150. In some embodiments, the molding device 145 in the method 180 is a mandrel 160. In some embodiments of the method 180, the ferromagnetic particles 170 are selected from the group consisting of $Fe_3O_4$, $Fe_2O_3$, $Cr_2O_3$, and $FeCr_2O_4$. In some embodiments of the method 180, the ferromagnetic particles 170 have sizes in the range of about five nanometers to about one hundred nanometers. In some embodiments of the method 180, the distributing step 182 involves the step of forming the molding device from a material with the ferromagnetic particles 170 mixed therein. In some embodiments of the method 180, the distributing step 182 involves the step of applying a layer of the ferromagnetic particles 170 to a surface, e.g. 158, 162, and 169 of the molding device 145. In some embodiments of the method 180, the application of the ferromagnetic particles 170 is performed by painting the outside surface e.g. 158, 162 and 169 of the molding device 145.

In some embodiments of the method 180, the interface composition 140 of the second placing step 186 further comprises ferromagnetic particles 170. In some embodiments of the method 180, there is an additional step of operatively associating ferromagnetic particles 170 with the multiple polymeric elements, e.g. 115, 125, that is performed prior to the heating step 188. In some embodiments of the method 180, the optional associating step comprises forming a micro-dispersion of the ferromagnetic particles 170 in an interior, e.g. 116, 126, of each polymeric element, e.g. 115, 116. In some embodiments, the optional associating step comprises applying the ferromagnetic particles 170 on a surface, e.g. 117, 127 of each polymeric element, e.g. 115, 125.

In some embodiments of the method 180, the distributing step 182 is not performed. In some embodiments of the method 180, the first placing step 184 comprises placing a first polymeric element 115 adjacent to a second polymeric element 125, wherein the first polymeric element 115 and the second polymeric element 125 are dissimilar, and wherein the second placing step 186 comprises placing the interface composition 140 between the first and second polymeric elements 115, 125.

In some embodiments of the method 180, the first placing step 182 comprises placing a first polymeric element comprising 115 a first polymer 118 adjacent to a second polymeric element 125 comprising a second polymer 128, and the second placing step 186 comprises placing the interface composition 140 between the first and second polymeric elements, 115, 125, and wherein the first polymer 118 is present at less than 99.999% by weight in the second polymeric element 125, and wherein the second polymer 128 is present at less than 99.999% by weight in the first polymeric element 115. In those embodiments, wherein the first and second polymeric elements, 115, 125, do not have the same composition, they are understood to be "dissimilar."

In some embodiments of the method 180, the interface composition 140 of the second placing step 186 comprises the first polymer 118 and the second polymer 128. In some embodiments, the interface composition 140 of the second placing step further comprises ferromagnetic particles 170. In those embodiments wherein the interface composition comprises the first and second polymers 118, 128, the first polymer may be a thermoplastic elastomer material and the second polymer may be a non-compatible TPE material.

With specific reference to FIG. 6C, in some embodiments, the method 180 is used to join two catheter components 172 and 174 respectively to form a catheter component bond. A catheter component bond formed from various embodiments of the method 180 is contemplated by this disclosure. In some embodiments, the method 180 may comprise a first polymeric element 115 operatively associated with a first catheter component 172, and the second polymeric element 125 is operatively associated with a second catheter component 174. In some such embodiments the first catheter component 172 is a first shaft and the second catheter component 174 is selected from the group consisting of a second shaft and a balloon.

Figure 9:
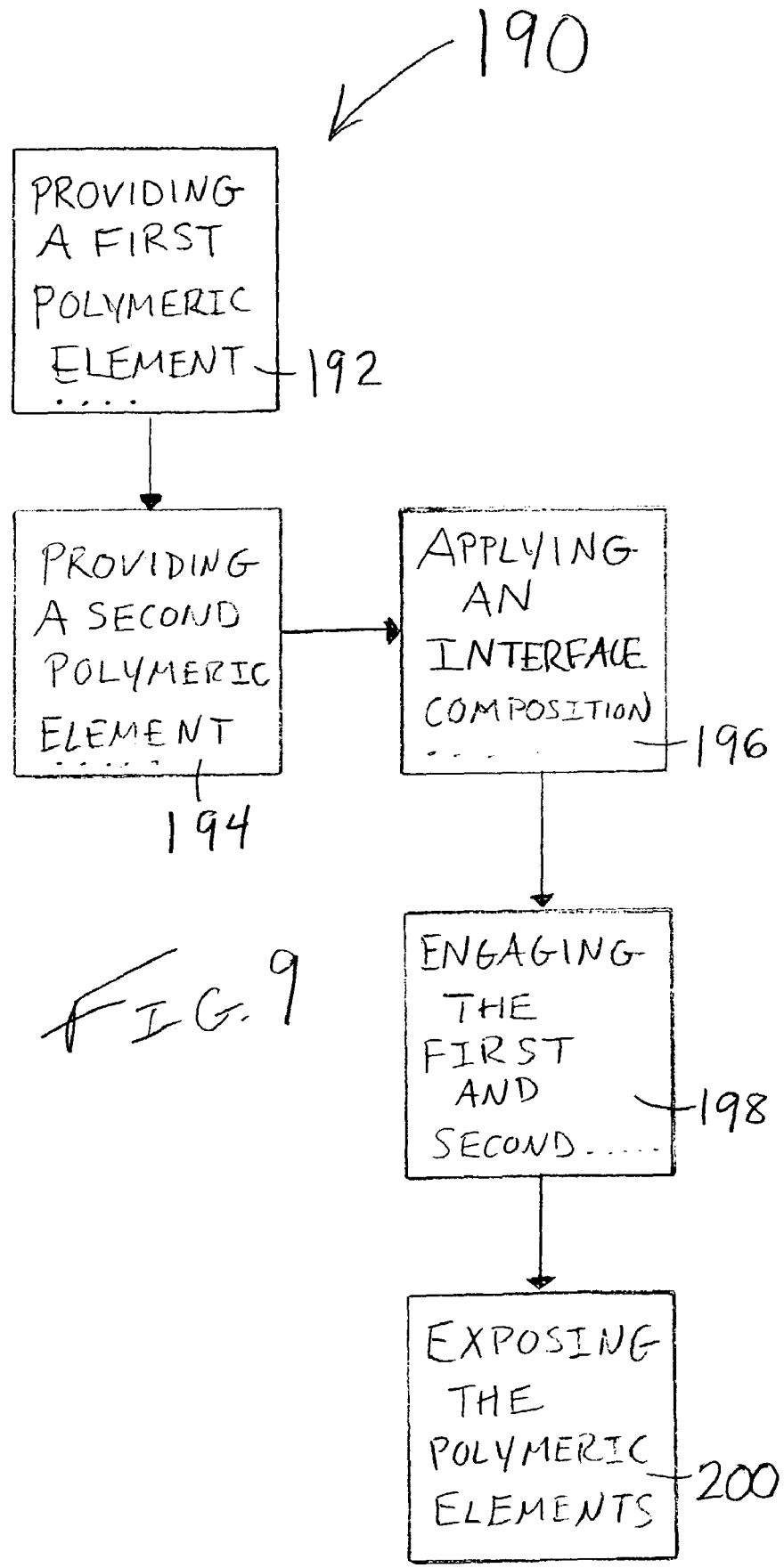
FIG. 9 is a flow chart depicting sample steps that may be taken according to a fourth method taught by the disclosure.

Now with regard to the flowchart of FIG. 9, reference being simultaneously had to the apparatus of FIG. 7A, a method 190 is provided for bonding multiple polymeric elements together. A first step 192 may be to provide a first polymeric element 115 comprising a first polymer 118. A second step 194 may be to provide a second polymeric element 125 comprising a second polymer 128. A third step 196 may be to apply an interface composition 140, comprising ferromagnetic particles 170, the first polymer 118, and the second polymer 118, to an outside surface 117, 127 of at least one of the first and second polymeric elements, 115, 125. In a fourth step 198, the first and second polymeric elements 115, 125 are engaged at a polymeric interface 135 with the interface composition 140 being placed between the first and second polymeric elements 115, 125. In a fifth step 200, the polymeric elements 115, 125 and interface composition 140 are exposed to an electromagnetic field 108. The exposing step causes said elements and composition to rise in temperature and thereby fuse the first and second polymeric elements 115, 125 together.

In some embodiments of the method 190, the first polymer 118 and the second polymer 128 are the same polymer. In some embodiments of the method 190, the first polymeric element 115 and the second polymeric element 125 are dissimilar. In some embodiments of the method 190, the first polymeric element 115 comprises less than 99.999% by weight of the second polymer 128, and the second polymeric element 125 comprises less that 99.999% by weight of the first polymer 118. In those embodiments wherein the first polymeric element 115 and second polymeric element 125 do not have identical compositions, the elements are understood to be "dissimilar." In some embodiments of the method 190, the first polymer 118 is a thermoplastic elastomer material and the second polymer 128 is a non-compatible TPE material.

With specific reference to FIG. 7C, in some embodiments of the method 190, the first polymeric element 115 is operatively associated with a first catheter component 172, and the second polymeric element 125 is operatively associated with a second catheter component 174. In some such embodiments, the first catheter component 172 is a first shaft and the second catheter component 174 is selected from the group consisting of a second shaft and a balloon. A catheter component bond formed from various embodiments of the method 190 is contemplated by this disclosure.

In some embodiments of the method 190, the ferromagnetic particles 170 are selected from the group consisting of $Fe_3O_4$, $Fe_2O_3$, $Cr_2O_3$, and $FeCr_2O_4$. In some embodiments of the method 190, the ferromagnetic particles 170 have sizes in the range of about five nanometers to about one hundred nanometers. In some embodiments of the method 190, the ferromagnetic particles 170 are operatively associated with the polymeric elements, e.g. 115, 125 of the first providing step. In some embodiments of the method 190, the ferromagnetic particles 170 are in the form of a micro-dispersion in an interior portion, e.g. 116, 126, of each polymeric element, e.g., 115, 125. In some embodiments of the method 190, the ferromagnetic particles 170 have been applied to an outside surface, e.g. 117, 127, of each of the polymeric elements, e.g. 115, 125. In some embodiments of the method 190, the ferromagnetic particles 170 are absent from the interface composition 140.

Figure 10:
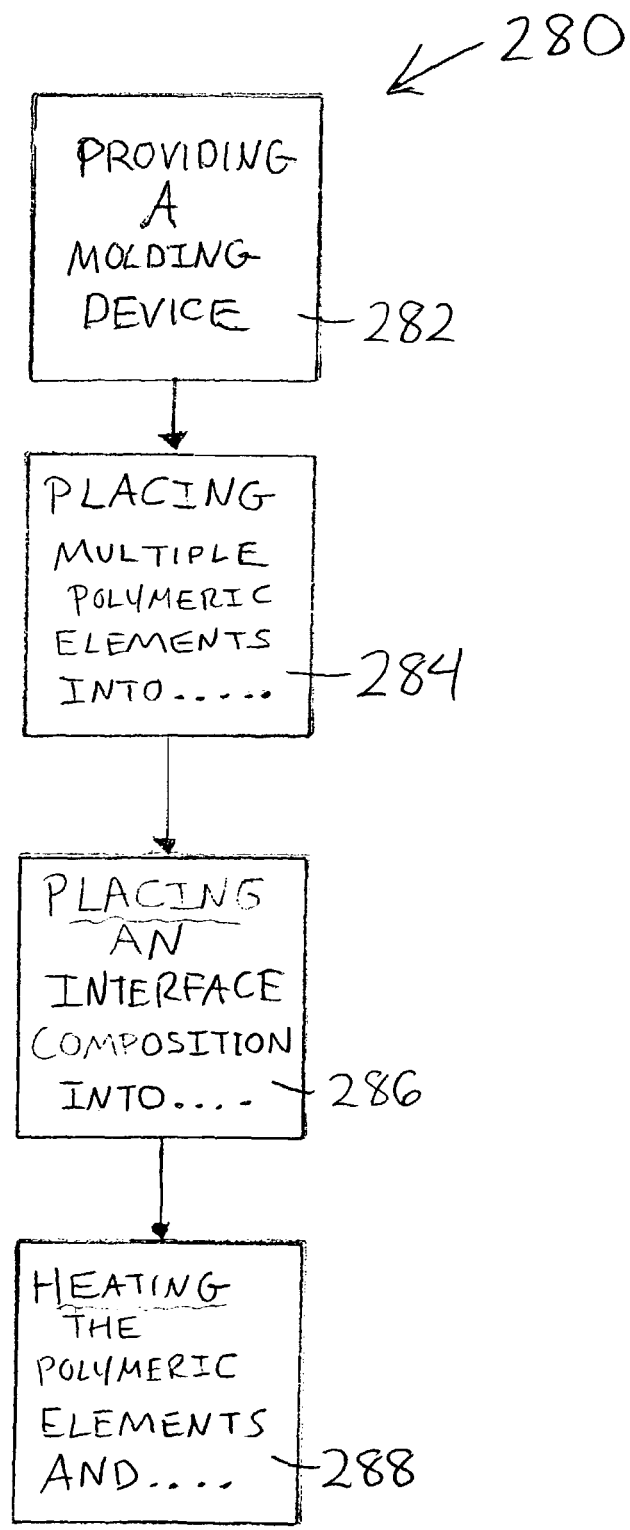
FIG. 10 is a flow chart depicting sample steps that may be taken according to a fifth method taught by the disclosure.

Next with regard to the flowchart of FIG. 10, reference being simultaneously had to the apparatus of FIG. 6B, a method 280 is provided for bonding multiple polymeric elements. A first step 282 may be to provide a molding device 145. A second step 284 may be to place multiple polymeric elements, e.g. 115, 125, into operative association with the molding device 145; wherein a polymeric element contacts an adjacent polymeric element at an interface 135; wherein there are ferromagnetic particles 170 present within about 500 nm of a plane α parallel to surfaces, e.g. 117, 127 of two adjacent polymeric elements, e.g. 115, 125, said plane equidistant from said surfaces at the interface 135. In a third step 286, an interface composition is placed into operative association with the multiple polymeric elements at the interfaces, e.g.

135. In a fourth step 288, the polymeric elements and interface composition are heated at least to a fusion temperature of the polymeric element with the highest fusion temperature. Embodiments and attributes ascribed thereto for method 180 may also apply to method 280.

With regard to the flowchart of FIG. 11, reference being simultaneously had to the apparatus of FIG. 7B, a method 290 is provided for bonding multiple polymeric elements. A first step 292 may be to provide a first polymeric element 115 comprising a first polymer 118. A second step 294 may be to provide a second polymeric element 125 comprising a second polymer 128. In a third step 296, an interface composition 140 comprising the first polymer 118 and the second polymer 128 is applied to an outside surface, e.g. 117, 127, of at least one of the first and second polymeric elements, 115, 125. A fourth step. 298 may be to engage the first and second polymeric elements, 115, 125, at an interface 135 with the interface composition 140 being placed between the first and second polymeric elements, 1 15, 125. In a fifth step 300, the polymeric elements, 115, 125 and interface composition 140 are exposed to an electromagnetic field 108, the exposing step causing said elements and composition to rise in temperature and thereby fuse the first and second polymeric elements 115, 125 together, wherein there are ferromagnetic particles 170 within about 500 nm of a plane $\alpha$ parallel to surfaces, e.g. 117, 127, of two adjacent polymeric elements, e.g., 115, 125, said plane being equidistant from said surfaces. Embodiments and attributes ascribed thereto for method 190 may also apply to method 290.

The order of the steps of the above-described methods in some embodiments may be varied or not performed in whole or part. In some embodiments, additional steps may be performed before, after, and in between the particular steps of the above-described methods. In some embodiments, ferromagnetic materials need not be present or utilized. In such methods, other means for heating and fusing polymeric elements are employed besides inductive heating that is dependent on inductive heating, ferromagnetic particles and magnetic fields. Such embodiments may employ heating methods such as lasers and Hot-Jaw.

From the forgoing, one of skill in the art will appreciate that this disclosure teaches molding apparatuses and methods of bonding both similar and dissimilar polymeric elements for use in catheter construction and other contexts. These apparatuses and methods allow for the more time and cost efficient construction of catheters and other devices.

The foregoing description of apparatuses and methods have been set forth merely to illustrate the disclosure and are not intended to be limiting. Because modifications of the disclosed embodiments incorporating the spirit and substance of the disclosure may occur to persons skilled in the art, the disclosure should be construed to include everything within the scope of the appended claims and equivalents thereof.

The invention claimed is:

1. A method of bonding multiple polymeric elements to form a catheter sized for insertion into a lumen of a body, comprising:
providing a molding device having ferromagnetic particles distributed therethrough, the molding device comprising an inner mandrel sized to form the shaft of the catheter and an outer shell sized to form a balloon of the catheter;
placing a first polymeric element into operative association on the mandrel to form the shaft and placing a second polymeric element into operative association inside the outer shell to form the balloon on the shaft;
placing an interface composition into operative association with the multiple polymeric elements, the interface composition containing the first polymeric element and the second polymeric element, said interface composition being free of ferromagnetic particles;
closing the outer shell to clamp the polymeric elements together between the inner mandrel and outer shell; and
exposing the molding device to an electromagnetic field thereby heating the polymeric elements and interface composition at least to a fusion temperature of the polymeric element with the highest fusion temperature.

2. The method of claim 1, wherein the molding device is a clam shell mold.

3. The method of claim 1, wherein the ferromagnetic particles are selected from the group consisting of $Fe_3O_4$, $Fe_2O_3$, $Cr_2O_3$, and $FeCr_2O_4$.

4. The method of claim 1, wherein the ferromagnetic particles have sizes in the range of about five nanometers to about one hundred nanometers.

5. The method of claim 1, wherein the first polymeric element and the second polymeric element are dissimilar and the interface composition is placed between the first and second polymeric elements.

6. The method of claim 1, wherein the first polymer is a thermoplastic elastomer material and the second polymer is a non-compatible thermoplastic elastomer material.

7. A method of bonding multiple polymeric elements together to form a catheter sized for insertion into a lumen of a body, comprising:
providing a first polymeric element comprising a first polymer on an inner mandrel sized to form a tubular shaft of the catheter;
providing a second polymeric element comprising a second polymer in an outer clam shell sized to form a balloon or an outer tubular shaft of the catheter, at least one of the mandrel and outer clam shell containing ferromagnetic particles;
applying an interface composition, not including ferromagnetic particles, but including the first polymer, and the second polymer to a surface of at least one of the first and second polymeric elements;
engaging the first and second polymeric elements at an interface with the interface composition being placed between the first and second polymeric elements by clamping the clam shell around the mandrel with the first and second polymeric elements and interface composition disposed therebetween; and
exposing the at least one of the mandrel and outer clam shell containing ferromagnetic particles to an electromagnetic field, the exposing step causing said elements and composition to rise in temperature and thereby fuse the first and second polymeric elements together.

8. The method of claim 7, wherein the first polymer and the second polymer are the same polymer.

9. The method of claim 7, wherein the first polymeric element and the second polymeric element are dissimilar.

10. The method of claim 7, wherein the first polymer is a thermoplastic elastomer material and the second polymer is a non-compatible thermoplastic elastomer material.

11. The method of claim 7, wherein the ferromagnetic particles are selected from the group consisting of $Fe_3O_4$, $Fe_2O_3$, $Cr_2O_3$, and $FeCr_2O_4$.

12. The method of claim 7, wherein the ferromagnetic particles have sizes in the range of about five nanometers to about one hundred nanometers.

13. A method of bonding multiple polymeric elements to form a balloon catheter sized for insertion into a lumen of a body, comprising:

provding a molding device comprising an inner mandrel sized to form a shaft of the catheter and an outer clam shell sized to form a balloon of the catheter, at least one of the mandrel and outer clam shell containing ferromagnetic particles;

placing multiple polymeric elements into operative association with the molding device including a first polymeric element on the mandrel to form the shaft and a second polymeric clement in the clam shell to form the balloon;

wherein one polymeric element contacts an adjacent polymeric element at an interface;

wherein the ferromagnetic particles are present within about 500 nm of a plane parallel to surfaces of two adjacent polymeric elements, said plane equidistant from said surfaces at the interface;

placing an interface composition into operative association with the multiple polymeric elements at the interfaces, the interface composition containing the first polymeric element and the second polymeric element, said interface composition being free of ferromagnetic particles;

closing the outer shell around the inner mandrel with the polymeric elements disposed therebetween to form the balloon catheter; and exposing the molding device to a magnetic field thereby heating the polymeric elements and interface composition at least to a fusion temperature of the polymeric element with the highest fusion temperature.

14. The method of claim 13, wherein the ferromagnetic particles are selected from the group consisting of $Fe_3O_4$, $Fe_2O_3$, $Cr_2O_3$, and $FeCr_2O_4$.

15. The method of claim 13, wherein the ferromagnetic particles have sizes in the range of about five nanometers to about one hundred nanometers.

16. The method of claim 13, wherein the first polymer of the second placing step is a thermoplastic elastomer material and the second polymer of the second placing step is a non-compatible thermoplastic elastomer material.

* * * * *